United States Patent Office 3,027,228
Patented Mar. 27, 1962

3,027,228
METHOD FOR PRODUCING TRIVALENT TITANIUM ORTHOPHOSPHATE
Morris L. Nielsen, Dayton, Ohio, and Lawrence K. Duncan, Bel Air, Md., assignors to Monsanto Chemical Company, St. Louis, Mo., a corporation of Delaware
No Drawing. Filed Aug. 15, 1956, Ser. No. 604,072
2 Claims. (Cl. 23—105)

This invention relates to a novel method for producing trivalent titanium orthophosphate.

It has now been found that trivalent titanium orthophosphate, i.e., Ti(III)PO$_4$, can be produced by oxidation of titanium monoxide according to the following reaction:

$$TiO + H_3PO_4 \rightarrow TiPO_4 + H_2O + \tfrac{1}{2}H_2$$

(Equation 1)

The process is readily carried out by mixing titanium monoxide and orthophosphoric acid together and heating the mixture to accelerate reaction thereof. Reaction is evidenced by evolution of gaseous hydrogen and development of the purple color characteristic of trivalent titanium ion.

Recovery of the Ti(III)PO$_4$ product can be effected by any one of several standard techniques, such as crystallization, extraction, etc. It is not necessary, however, that the titanium phosphate be isolated from the reaction mixture. For example, one of the uses for Ti(III)PO$_4$ involves reaction with a halide salt (for example, an alkali or alkaline earth metal salt, such as sodium chloride or calcium chloride) to form titanium trihalide in a manner somewhat analogous to the formation of titanium tetrachloride disclosed in U.S. 2,608,464. For this use of Ti(III)PO$_4$ it is much more practical to take the mixture resulting from reaction according to Equation 1, neutralize any excess acid with a basic alkali or alkaline earth metal compound such as sodium hydroxide, calcium hydroxide, calcium carbonate, sodium carbonate, etc., to give a mixture of the desired Ti(III)PO$_4$ along with alkali or alkaline earth metal phosphates. Such a mixture will serve very well as the source of Ti(III)PO$_4$ for reaction with a metal halide to form titanium trichloride.

The titanium monoxide used in the present process is a well known material which can be readily prepared by any of several prior art methods, such as by reaction of titanium dioxide and carbon according to the process described in Cave et al., U.S. 2,733,133. The orthophosphoric acid reactant can be utilized as 100% acid, but it will generally be more practical to use an aqueous solution thereof—for example, containing between about 35% and about 85% by weight of acid.

As indicated in the above equation, the titanium monoxide and phosphoric acid react in equimolar proportions. Neither of the reactants need be present in excess, but on the other hand an excess of either reactant will not be detrimental. It will sometimes be convenient to use an excess of phosphoric acid, since the acid is normally a liquid and can serve in a dual role of reactant and solvent.

As indicated above, the reaction takes place somewhat more readily with heating. In general, temperatures between about 35° C. and the boiling point of the reaction mixture will be most practical, but higher temperatures can be used if the reaction is carried out under greater than atmospheric pressure.

The following typical example of the preparation of Ti(III)PO$_4$ will serve to illustrate more completely the process of the present invention:

Example

One gram of powdered titanium monoxide and 10 grams of 85% orthophosphoric acid were heated to 250° C., at which point gaseous hydrogen began to evolve and the deep blue color characteristic of trivalent titanium appeared. Heating was continued for another 20 minutes at which time most of the titanium monoxide had dissolved and the reaction mixture became very viscous. The resulting product was cooled and obtained in the form of a viscous blue glass.

We claim:
1. The method of preparing trivalent titanium orthophosphate, which method comprises reacting titanium monoxide with at least one molar proportion of orthophosphoric acid.
2. The method of preparing trivalent titanium orthophosphate, which method comprises dissolving titanium monoxide in an aqueous orthophosphoric acid solution at a temperature between about 35° C. and the boiling temperature of said acid.

References Cited in the file of this patent
UNITED STATES PATENTS
2,702,425    Thompson _____ Feb. 22, 1955